(12) United States Patent
Kang et al.

(10) Patent No.: US 9,189,616 B2
(45) Date of Patent: *Nov. 17, 2015

(54) AUTHENTICATION METHOD BETWEEN CLIENT AND SERVER, MACHINE-READABLE STORAGE MEDIUM, CLIENT AND SERVER

(71) Applicants: Samsung Electronics Co. Ltd., Suwon-si, Gyeonggi-do (KR); KOREA UNIVERSITY RESEARCH AND BUSINESS FOUNDATION, Seoul (KR)

(72) Inventors: Bo-Gyeong Kang, Suwon-si (KR); Kyu-Young Choi, Seoul (KR); Hyo-Seung Kim, Seoul (KR); Ji-Eun Eom, Seoul (KR); Dong-Hoon Lee, Seoul (KR); Byeong-Rae Lee, Seoul (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 101 days.

This patent is subject to a terminal disclaimer.

(21) Appl. No.: 13/760,352

(22) Filed: Feb. 6, 2013

(65) Prior Publication Data

US 2013/0205379 A1 Aug. 8, 2013

(30) Foreign Application Priority Data

Feb. 7, 2012 (KR) ........................ 10-2012-0012389

(51) Int. Cl.
| | |
|---|---|
| G06F 15/16 | (2006.01) |
| G06F 17/30 | (2006.01) |
| H04L 29/06 | (2006.01) |
| H04L 9/32 | (2006.01) |
| G06F 21/44 | (2013.01) |

(52) U.S. Cl.
CPC .............. *G06F 21/44* (2013.01); *G06F 21/445* (2013.01); *H04L 9/3271* (2013.01); *G06F 2221/2103* (2013.01); *H04L 2209/046* (2013.01)

(58) Field of Classification Search
CPC ....... G06F 21/31; H04L 63/08; H04L 63/083; H04L 63/0861; H04L 9/32
USPC .......... 713/168–174, 182–186, 202; 709/225, 709/229; 726/2–8
See application file for complete search history.

(56) References Cited

U.S. PATENT DOCUMENTS

2011/0145590 A1* 6/2011 Harada et al. ................. 713/185
2013/0174243 A1* 7/2013 Inatomi et al. .................... 726/7

* cited by examiner

*Primary Examiner* — Evans Desrosiers
(74) *Attorney, Agent, or Firm* — Jefferson IP Law, LLP

(57) ABSTRACT

An authentication method between a server and a client is provided. The authentication method includes transmitting, to the client, an inquiry message including a first modified secret key generated based on a first secret key and a first blinding value, receiving, from the client, a response message including a response value generated based on the first blinding value, a second secret key, and an error value, calculating the error value from the response value, and determining whether authentication of the client has succeeded based on the error value.

20 Claims, 4 Drawing Sheets

AUTHENTICATION METHOD BETWEEN CLIENT AND SERVER, MACHINE-READABLE STORAGE MEDIUM, CLIENT AND SERVER

PRIORITY

This application claims the benefit under 35 U.S.C. §119 (a) of a Korean patent application filed on Feb. 7, 2012 in the Korean Intellectual Property Office and assigned Serial No. 10-2012-0012389, the entire disclosure of which is hereby incorporated by reference.

BACKGROUND OF THE INVENTION

1. Field of the Invention

The present invention relates generally to a lightweight authentication technique. More particularly, the present invention relates to an authentication method using a reduced number of resources.

2. Description of the Related Art

Authentication refers to a process of verifying whether a user or other object is real and is authorized to gain access. Authentication typically includes determining whether the object to be authenticated and the object requiring the authentication are aware of a secret key that they have previously shared. Authentication methods typically include a challenge-response scheme in which, if the object requiring an authentication sends an inquiry value to the object to be authenticated, the object to be authenticated generates a correct response value by using a secret key and returns the generated correct response value, so as to prove that the object to be authenticated is aware of the secret key.

Authentication methods using such a challenge-response scheme are classified into a method using an open key (or non-symmetric key) encryption system, a method using a secret key (or symmetric key) encryption system, a method using a Hash function, and a method using a logical operation. However, an apparatus having limited resources, and therefore typically having a very low calculation ability and storage capability, cannot use an authentication method requiring a large quantity of calculation, such as a symmetric key encryption system.

Among such apparatuses having limited resources, a Radio Frequency Identification (RFID) apparatus corresponds to a non-contact recognition medium which can provide various services, including services for circulation, distribution, inventory management, etc. In an RFID system, messages are exchanged using a non-contact RF communication between an RFID apparatus and a reader, and the reader uses an authentication method in order to identify whether the RFID apparatus is approved or not. In some cases, an inter-authentication method between a reader and an RFID apparatus is used.

However, current RFID systems suffer various security problems and user privacy violation problems. To address these problems, various lightweight authentication methods have been proposed. Since authentication methods based on a mathematically hard problem using a logical operation are mainly based on the difficulty of the problem of the Learning Parity with Noise (LPN), which is a Nondeterministic Polynomial-Hard (NP-Hard) problem, it is possible to prove the theoretical safety thereof.

However, the conventional authentication methods based on a mathematically hard problem using a logical operation are problematic in that they are vulnerable to a man-in-the-middle-attack. Accordingly, there is a need for an apparatus and method for providing an authentication that is safer against a man-in-the-middle-attack than the conventionally presented lightweight authentication techniques, that can provide a resource efficiency through minimization of storage quantity/operation quantity/transmission quantity, and that can provide safety based on a mathematically hard problem.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below.

Accordingly, an aspect of the present invention is to provide an authentication method, which is safer against a man-in-the-middle-attack than the conventionally presented lightweight authentication techniques, efficiently uses resources through minimization of storage quantity/operation quantity/transmission quantity, and can provide safety based on a mathematically difficult problem.

Another aspect of the present invention is to provide an authentication method that can reduce authentication time through bi-directional authentication.

In accordance with an aspect of the present invention, an authentication method between a server and a client is provided. The authentication method includes transmitting, to the client, an inquiry message including a first modified secret key generated based on a first secret key and a first blinding value, receiving, from the client, a response message including a response value generated based on the first blinding value, a second secret key, and an error value, calculating the error value from the response value, and determining whether authentication of the client has succeeded based on the error value.

In accordance with another aspect of the present invention, an authentication method between a server and a client is provided. The authentication method includes receiving, from the server, an inquiry message including a first modified secret key generated based on a first secret key and a first blinding value, authenticating the server based on the first blinding value, and transmitting, to the server, a response message including a response value generated based on the first blinding value, a second secret key, and an error value.

In accordance with another aspect of the present invention, a machine-readable storage medium in which a program for executing a method for authentication between a server and a client is recorded is provided.

In accordance with another aspect of the present invention, a server or client including the machine-readable storage medium is provided.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description of exemplary embodiments of the present invention, ordinal numbers used therein, such as first and second, are only for discrimination of objects with the same name and the sequence of them may be optionally determined. Further, a preceding description may be applied to an object of a posterior turn.

Figure 1:
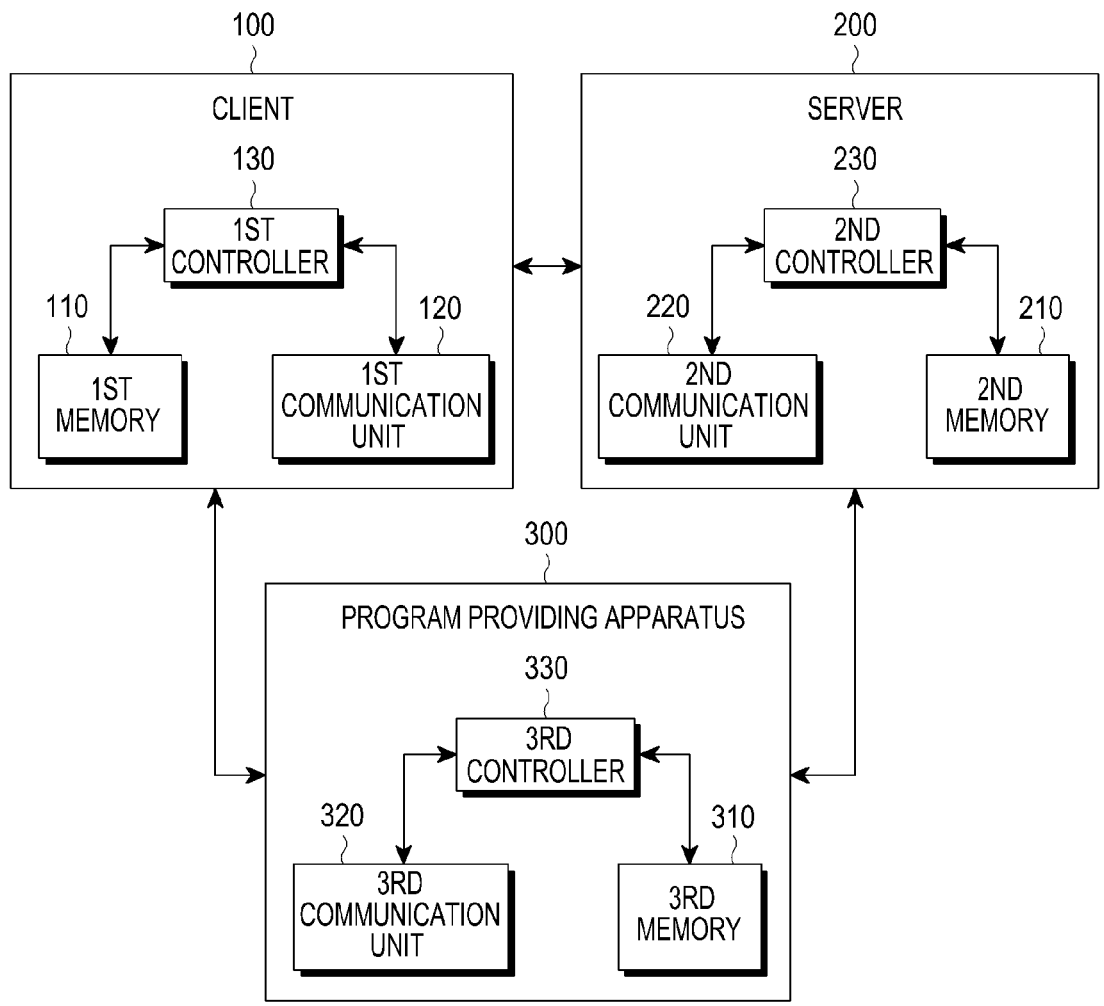
FIG. 1 is a block diagram illustrating an authentication system according to an exemplary embodiment of the present invention.

FIG. 1 is a block diagram illustrating an authentication system according to an exemplary embodiment of the present invention.

Referring to FIG. 1, the authentication system includes a client 100, which is an apparatus to be subject to authentication, a server 200, which provides the authentication, and a program providing apparatus 300, which provides programs including indications for executing pre-established authentication processes, respectively.

The client 100 includes a first memory 110, a first communication unit 120, and a first controller 130. The first memory 110 is provided for storing information, such as secret keys necessary for pre-established authentication processes. The first communication unit 120 is provided for performing wired or wireless communication with the server 200. The first controller 130 is provided for performing an authentication process pre-established for the server 200 by using the first memory 110 and the first communication unit 120.

The server 200 includes a second memory 210, a second communication unit 220, and a second controller 230. The second memory 210 is provided for storing information, such as secret keys necessary for pre-established authentication processes. The second communication unit 220 is provided for performing wired or wireless communication with the client 100. The second controller 230 is provided for performing an authentication process pre-established for the client 100 by using the second memory 210 and the second communication unit 220.

The program providing apparatus 300 includes a third memory 310, a third communication unit 320, and a third controller 330. The third memory 310 is provided for storing programs including indications for execution of pre-established authentication processes by the client 100 and/or the server 200 and information necessary for the authentication processes. The third communication unit 320 is provided for performing wired or wireless communication with the client 100 and/or the server 200. The third controller 330 is provided for transmitting a corresponding program to the client 100 and/or the server 200 either automatically or in response to the client 100 and/or the server 200.

The server 200 and the client 100 share information necessary for an authentication process, such as secret keys. More specifically, the shared information includes a binary vector x of k bits corresponding to a first secret key, a binary vector y of k bits corresponding to a second secret key, a binary matrix x with a size of (m×k) corresponding to a third secret key, and an error occurrence parameter η, which is a probability value satisfying a relation, $0<\eta<\frac{1}{2}$. Here, each of the vectors and the matrix may be expressed by a bit stream. Each of the server 200 and the client 100 may receive information necessary for a corresponding program and/or authentication process either automatically or in response to a corresponding user.

Figure 2:
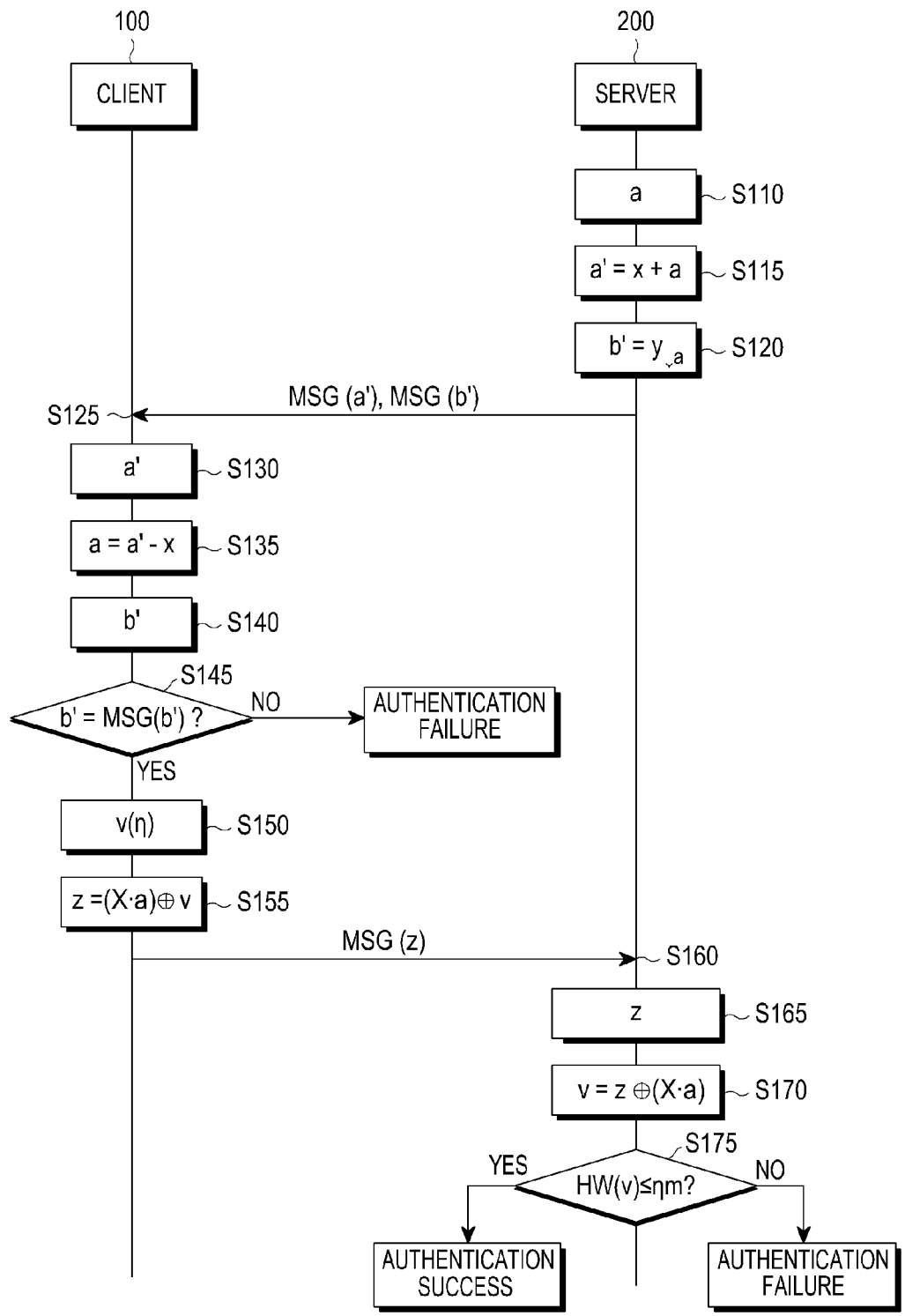
FIG. 2 is a diagram for describing an authentication method between a client and a server according to a first exemplary embodiment of the present invention.

FIG. 2 is a diagram for describing an authentication method between a client and a server according to a first exemplary embodiment of the present invention.

In step S110, the server 200 generates a k bit binary vector a ($\in\{0,1\}^k$) corresponding to a blinding vector. A binary vector (or matrix) refers to a vector (or matrix) consisting of 0 or 1. Each bit of the blinding vector a may be randomly selected from bit values of 0 and 1. For example, Equation (1) below shows an example of the blinding vector a when k is set to 10 (k=10).

$$a=(0110101010) \tag{1}$$

In step S115, the server 200 generates a first modified secret key a' of k bits based on the first secret key x and the blinding vector a according to a first pre-established function. In this example, the first function is a function in which the first secret key x, known to the client 100, and the blinding vector a, not known to the client 100, are given as input values and the first modified secret key a' (a'=x+a), obtained by adding the first secret key x and the blinding vector a, is given as an output value. Here, the client 100 and the server 200 share the first function. The fact that the client 100 and the server 200 share the first function refers to the fact that the client 100 knows the first function. The client 100 stores the first function and a first inverse function corresponding to the first function in the first memory 110. In the present example, an additive function (i.e., a summing function) is used as the first function. However, various other logical operation functions, such as a subtraction function, an exclusive OR (XOR) function, and the like, may be used as the first function, and the same can be said for the other functions. The terms, "a secret key" and "a modified secret key," may be renamed "an original secret key" and "a modified secret key" for discrimination between them. Equations (2) and (3) below show examples of the first secret key x and the first modified secret key a'.

$$x = (0\ 1\ 1\ 0\ 0\ 1\ 0\ 0\ 1\ 0) \quad (2)$$

$$a' = \frac{\begin{array}{c}0\ 1\ 1\ 0\ 0\ 1\ 0\ 0\ 1\ 0\ +\\ 0\ 1\ 1\ 0\ 1\ 0\ 1\ 0\ 1\ 0\end{array}}{1\ 1\ 0\ 0\ 1\ 1\ 1\ 1\ 0\ 0} \quad (3)$$

In step S120, the server 200 generates a second modified secret key b' of k bits based on a second secret key y and the blinding vector a according to a second pre-established function. In this example, the second function is a partial extraction function in which the second secret key y, known to the client 100, and the blinding vector a, not known to the client 100, are given as input values, and the second modified secret key b' (b'=$y_{\downarrow a}$), obtained by extracting bits at positions having a bit value of 1 in the blinding vector a from the second secret key y, is given as an output value. Here, the client 100 and the server 200 share the second function. That is, the client 100 stores the second function in the first memory 110. Equations (4) and (5) below show examples of the second secret key y and the second modified secret key b'.

$$y = (1\ 1\ 0\ 1\ 0\ 0\ 0\ 1\ 0\ 1) \quad (4)$$

$$b' = y_{\downarrow a} = \frac{\begin{array}{c}1\ 1\ 0\ 1\ 0\ 0\ 0\ 1\ 0\ 1\\ 0\ 1\ 1\ 0\ 1\ 0\ 1\ 0\ 1\ 0\end{array}}{1\ 0\ \ \ \ 0\ 0\ 0} \quad (5)$$

In step S125, the server 200 generates and transmits a first inquiry message MSG(a') including the first modified secret key a' and a second inquiry message MSG(b') including the second modified secret key b' to the client 100. Although two messages are transmitted in the present example, the first and second modified secret keys may be included in and transmitted by one message.

In step S130, the client 100 having received the first and second inquiry messages extracts the first modified secret key a' from the first inquiry message MSG(a').

In step S135, the client 100 calculates the blinding vector a based on the first modified secret key a' and the first secret key x according to the first inverse function corresponding to the first function. In the present example, the first inverse function is a subtraction function (i.e., a reduction function) in which the first secret key x and the first modified secret key a' are given as input values and the blinding vector a (a=a'−x), obtained by subtracting the first secret key x from the first modified secret key a', is given as an output value. Equation (6) below shows an expression for deriving the blinding vector a by using the first inverse function.

$$a = \frac{\begin{array}{c}1\ 1\ 0\ 0\ 1\ 1\ 1\ 1\ 0\ 0\ -\\ 0\ 1\ 1\ 0\ 0\ 1\ 0\ 0\ 1\ 0\end{array}}{0\ 1\ 1\ 0\ 1\ 0\ 1\ 0\ 1\ 0} \quad (6)$$

In step S140, the client 100 calculates (or generates) the second modified secret key b' based on the second secret key y and the blinding vector a according to the second function.

In step S145, the client 100 compares the calculated second modified secret key b' with the second modified secret key b' extracted from the second inquiry message MSG(b'). When the calculated second modified secret key b' is identical to the second modified secret key b' extracted from the second inquiry message MSG(b'), the client 100 processes the authentication of the server 200 as a success and then performs the next step S150.

On the other hand, when the calculated second modified secret key b' is not identical to the second modified secret key b' extracted from the second inquiry message MSG(b'), the client 100 processes the authentication of the server 200 as a failure and does not perform the next step S150. Although not illustrated, the client 100 may transmit a result of the authentication to the server 200. Further, the server 200 may include a display unit, such as a monitor, and an output unit, such as a speaker or a printer, and may display the result of authentication through the output unit by means of a screen, a sound, or a printed object. Otherwise, the client 100 may transmit the result of authentication through the first communication unit 120 to another server or another communication terminal, such as a portable terminal.

In step S150, the client 100 generates a binary vector v of m bits corresponding to an error vector. Based on a definition that v={$v_1, v_2, \ldots, v_m$}, the error vector v is a binary vector in which a probability of a case in which v1=1 is η. The error vector is a vector having bits determined according to the error occurrence parameter η, which is a probability value satisfying 0<η<½. The bit number m of the error vector and the bit number k of the blinding vector are natural numbers, respectively. The binary vector v may be an output value of a random function having the error occurrence parameter as an input value thereof, and may also be expressed as v(η). For example, parameters may be set such that m=5 and η=⅕. Equation (7) below shows an example of the binary vector v.

$$v = (0\ 0\ 0\ 1\ 0) \quad (7)$$

In step S155, the client 100 generates a response vector of m bits based on the third secret key X, the blinding vector a, and the error vector v according to a pre-established third function. In the present example, the third function is a function in which the third secret key X, the blinding vector a, and the error vector v are given as input values and a response vector z (=(X·a)⊕v), obtained by performing an XOR operation on the error vector v and a value obtained by performing an inner product operation on the third secret key X and the blinding vector a, is given as an output value. Equation (8) below shows an example of the response vector z.

$$z = Xa \oplus v \quad (8)$$

$$= \begin{pmatrix} 0 & 1 & 1 & 0 & 1 & 1 & 0 & 1 & 0 & 0 \\ 1 & 0 & 1 & 1 & 0 & 1 & 1 & 0 & 1 & 0 \\ 1 & 1 & 0 & 1 & 1 & 0 & 1 & 1 & 0 & 1 \\ 1 & 1 & 1 & 0 & 1 & 1 & 0 & 1 & 1 & 0 \\ 1 & 1 & 1 & 1 & 0 & 1 & 1 & 0 & 1 & 1 \end{pmatrix} \begin{pmatrix} 0 \\ 1 \\ 1 \\ 0 \\ 1 \\ 0 \\ 1 \\ 0 \\ 1 \\ 0 \end{pmatrix} \oplus \begin{pmatrix} 0 \\ 0 \\ 0 \\ 1 \\ 0 \end{pmatrix}$$

$$= \begin{pmatrix} 1 \\ 1 \\ 1 \\ 0 \\ 0 \end{pmatrix} \oplus \begin{pmatrix} 0 \\ 0 \\ 0 \\ 1 \\ 0 \end{pmatrix} = \begin{pmatrix} 1 \\ 1 \\ 1 \\ 1 \\ 0 \end{pmatrix}$$

In step S160, the client 100 generates a response message MSG(z) including the response vector z and transmits the generated response message MSG(z) to the server 200.

In step S165, the server 200 receives the response message MSG(z) and extracts the response vector z from the response message MSG(z).

In step S170, the server 200 calculates the error vector v based on the third secret key X, the blinding vector a, and the response vector z according to a third inverse function corresponding to the third function. In the present example, the third inverse function is a function in which the third secret key X, the blinding vector a, and the error vector v are given as input values and an error vector v $(=z \oplus (X \cdot a))$ obtained by performing an XOR operation on a value obtained by performing an inner product operation on the third secret key X and the blinding vector a is given as an output value. Equation (9) below shows an example of an expression for deriving the error vector by using the third inverse function.

$$v = z \oplus Xa \qquad (9)$$

$$= \begin{pmatrix} 1 \\ 1 \\ 1 \\ 1 \\ 0 \end{pmatrix} \oplus \begin{pmatrix} 1 \\ 1 \\ 1 \\ 0 \\ 0 \end{pmatrix} = \begin{pmatrix} 0 \\ 0 \\ 0 \\ 1 \\ 0 \end{pmatrix}$$

In step S175, the server 200 calculates a Hamming weight of the error vector v and compares the calculated Hamming weight with a threshold value ηm (ηm=η·m). When the Hamming weight is smaller than or equal to the threshold value ηm, the server 200 processes the authentication of the client 100 as a success. In contrast, when the Hamming weight exceeds the threshold value ηm, the server 200 processes the authentication of the client 100 as a failure. Here, the Hamming weight refers to the number of bits having a value of 1 among the bits of the error vector. Differently from the present example, the number of bits having a value of 0 among the bits of the error vector may be compared with the threshold value (the number of the entire bits of the error vector, i.e., ηm). Equation (10) below shows an example of a Hamming weight of the error vector v.

$$HW(v) = HW(0\ 0\ 0\ 1\ 0) \qquad (10)$$

$$= 1 \le \frac{1}{5} \cdot 5$$

Although not illustrated, the server 200 may transmit a result of the authentication to the client 100. Further, the client 100 may include a display unit, such as a monitor, and an output unit, such as a speaker or a printer, and may display the result of authentication through the output unit by means of a screen, a sound, or a printed object. Otherwise, the server 200 may transmit the result of authentication through the second communication unit 220 to another server or another communication terminal, such as a portable terminal.

Further, for the sharing of secret keys and parameters between the client 100 and the server 200, a step in which the client 100 and the server 200 receive secret keys and parameters from the program providing apparatus 300, respectively, may be added before step S110. Otherwise, the client 100 may receive secret keys and parameters, and vice versa.

In the illustrated example, not only does the server 200 secretly transmit a secret key by using a blinding vector, but also even the client 100 can authenticate the server 200, which can reduce the number of steps of the authentication process and can enhance safety.

The illustrated embodiment shows an example in which the client 100 authenticates the server 200 based on one blinding value included in an inquiry message and the server 200 authenticates the client 100 based on a response value included in a response message.

In the following description of the second exemplary embodiment, which includes an authentication method using two blinding vectors, a repetitive description relating to the first exemplary embodiment is omitted.

Figure 3:
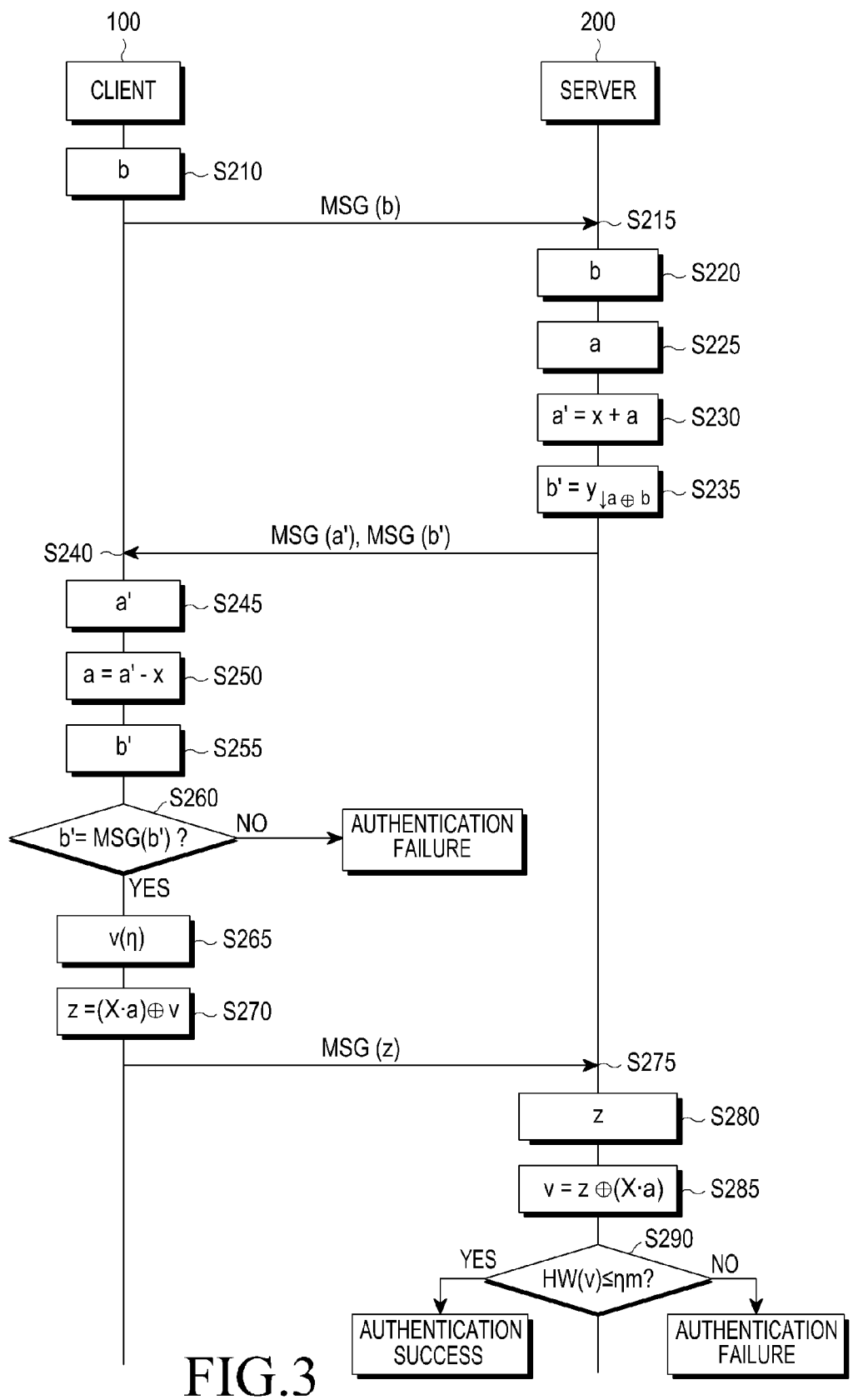
FIG. 3 is a diagram for describing an authentication method between a client and a server according to a second exemplary embodiment of the present invention.

FIG. 3 is a diagram for describing an authentication method between a client and a server according to a second exemplary embodiment of the present invention.

In step S210, the client 100 generates a k bit binary vector b ($\in \{0,1\}^k$) corresponding to a second blinding vector. The second blinding vector b is a vector not known to the server 200, and each bit of the second blinding vector b may be randomly selected from bit values of 0 and 1. For example, k may be set to 10 (k=10) and Equation (11) below shows an example of the second blinding vector b.

$$b = (0101100011) \qquad (11)$$

In step S215, the client 100 generates a blinding message MSG(b) including the second blinding vector b and transmits the generated blinding message MSG(b) to the server 200.

In step S220, the server 200 receives the blinding message MSG(b) and extracts the second blinding vector b from the blinding message MSG(b).

In step S225, the server 200 generates a k bit binary vector a ($\in \{0,1\}^k$) corresponding to a first blinding vector. The first blinding vector a is a vector not known to the server 200, and each bit of the first blinding vector a may be randomly selected from bit values of 0 and 1. For example, k may be set to 10 (k=10) and Equation (12) below shows an example of the first blinding vector a.

$$a = (0110101010) \qquad (12)$$

In step S230, the server 200 generates a first modified secret key a' of k bits based on the first secret key x and the first blinding vector a according to a first pre-established function. In this example, the first function is a function in which the first secret key x, known to the client 100, and the first blinding vector a, not known to the client 100, are given as input values, and the first modified secret key a' (a'=x+a), obtained by adding the first secret key x and the first blinding vector a, is given as an output value. Here, the client 100 and the server 200 share the first function. Equations (13) and (14) below show examples of the first secret key x and the first modified secret key a'.

$$x = (0\ 1\ 1\ 0\ 0\ 1\ 0\ 0\ 1\ 0) \qquad (13)$$

-continued $$a' = \frac{\begin{array}{c}0\ 1\ 1\ 0\ 0\ 1\ 0\ 0\ 1\ 0\ + \\ 0\ 1\ 1\ 0\ 1\ 0\ 1\ 0\ 1\ 0\end{array}}{1\ 1\ 0\ 0\ 1\ 1\ 1\ 1\ 0\ 0} \quad (14)$$

In step S235, the server 200 generates a second modified secret key b' of k bits based on the second secret key y and the first and second blinding vectors a and b according to a second pre-established function. In this example, the second function is a partial extraction function in which the second secret key y and the second blinding vector b known to the client 100 and the first blinding vector a not known to the client 100 are given as input values and a second modified secret key b', obtained by calculating a selection vector (=a⊕b), which is obtained by performing an XOR operation on the first and second blinding vectors a and b, and then extracting bits at positions having a bit value of 1 in the selection vector from the second secret key y, is given as an output value. Here, the client 100 and the server 200 share the second function. That is, the client 100 stores the second function in the first memory 110. Equations (15) and (16) below show examples of the selection vector and the second modified secret key b'.

$$a \oplus b = \frac{\begin{array}{c}0\ 1\ 1\ 0\ 1\ 0\ 1\ 0\ 1\ 0\ \oplus \\ 0\ 1\ 0\ 1\ 1\ 0\ 0\ 0\ 1\ 1\end{array}}{0\ 0\ 1\ 1\ 0\ 0\ 1\ 0\ 0\ 1} \quad (15)$$

$$b' = y_{\downarrow a \oplus b} = 0101 \quad (16)$$

In step S240, the server 200 generates and transmits a first inquiry message MSG(a') including the first modified secret key a' and a second inquiry message MSG(b') including the second modified secret key b' to the client 100. Although two messages are transmitted in the present example, the first and second modified secret keys may be included in and transmitted by one message.

In step S245, the client 100, having received the first and second inquiry messages, extracts the first modified secret key a' from the first inquiry message MSG(a').

In step S250, the client 100 calculates the blinding vector a based on the first modified secret key a' and the first secret key x according to the first inverse function corresponding to the first function. In the present example, the first inverse function is a subtraction function (i.e., a reduction function) in which the first secret key x and the first modified secret key a' are given as input values and the blinding vector a (a=a'−x), obtained by subtracting the first secret key x from the first modified secret key a', is given as an output value. Equation (17) below shows an expression for deriving the blinding vector a by using the first inverse function.

$$a = \frac{\begin{array}{c}1\ 1\ 0\ 0\ 1\ 1\ 1\ 1\ 0\ 0\ - \\ 0\ 1\ 1\ 0\ 0\ 1\ 0\ 0\ 1\ 0\end{array}}{0\ 1\ 1\ 0\ 1\ 0\ 1\ 0\ 1\ 0} \quad (6)$$

In step S225, the client 100 calculates the second modified secret key b' based on the second secret key y and the first and second blinding vectors a and b according to the second function.

In step S260, the client 100 compares the calculated second modified secret key b' with the second modified secret key b' extracted from the second inquiry message MSG(b'). When the calculated second modified secret key b' is identical to the extracted second modified secret key b', the client 100 processes the authentication of the server 200 as a success and then performs the next step S265.

On the other hand, when the calculated second modified secret key b' is not identical to the extracted second modified secret key b', the client 100 processes the authentication of the server 200 as a failure and does not perform the next step S265. Although not illustrated, the client 100 may transmit a result of the authentication to the server 200.

The following steps S265, S270, S275, S280, S285, and S290 are substantially the same as steps S150, S155, S160, S165, S170, and S175 of the first exemplary embodiment, so a repetitive description thereof will be omitted here.

In the exemplary embodiments described above, the server 200 transmits not only the first modified secret key but also a second modified secret key for authentication of the server.

In the following description of the third embodiment, which shows an example of an authentication method using only a first modified secret key, a repetitive description relating to the first exemplary embodiment will be omitted.

Figure 4:
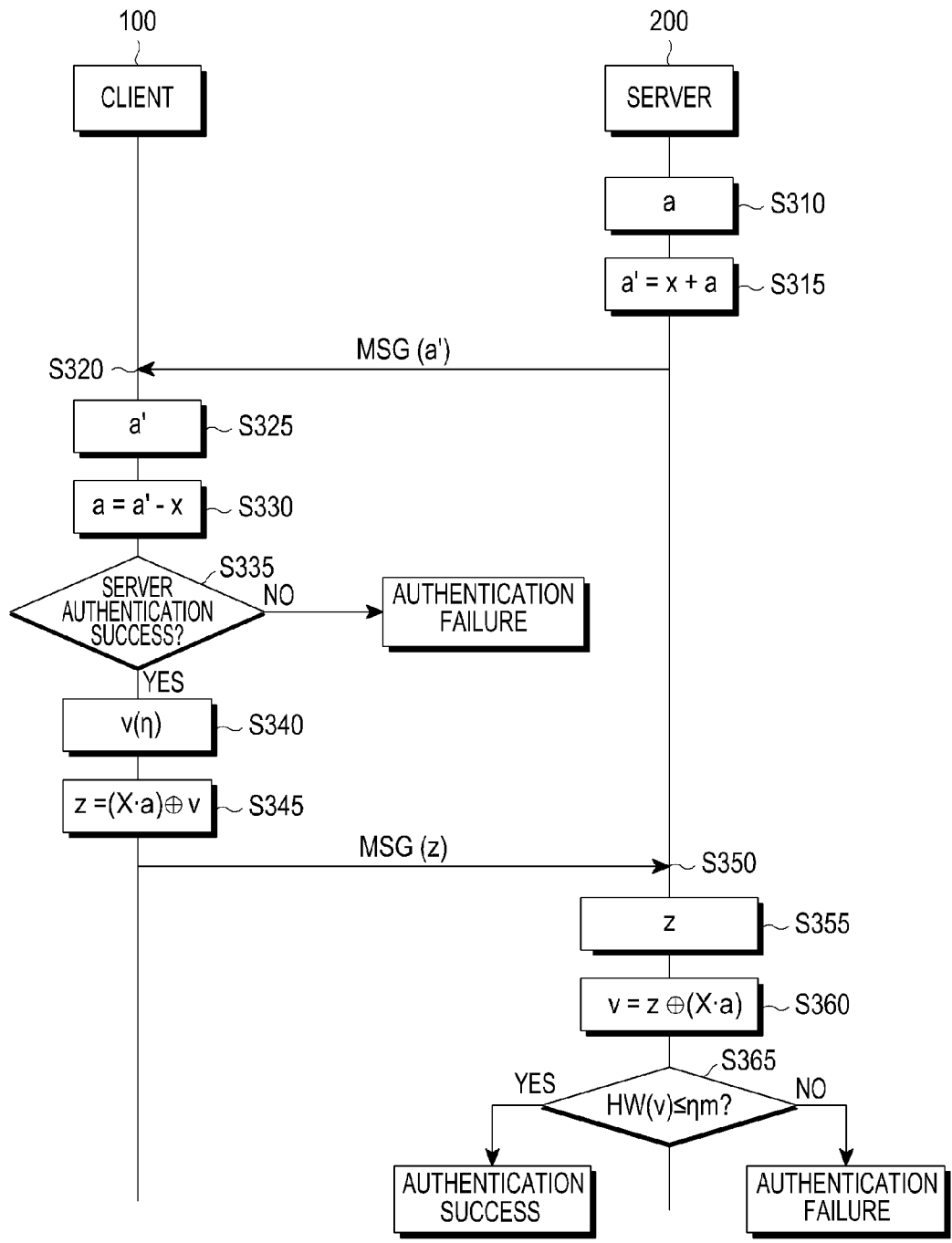
FIG. 4 is a diagram for describing an authentication method between a client and a server according to a third exemplary embodiment of the present invention.

FIG. 4 is a diagram for describing an authentication method between a client and a server according to a third exemplary embodiment of the present invention.

In step S310, the server 200 generates a k bit binary vector a (∈{0,1}k) corresponding to a blinding vector. The blinding vector a is a vector not known to the client 100, and each bit of the blinding vector a may be randomly selected from bit values of 0 and 1.

In step S315, the server 200 generates a modified secret key a' of k bits based on the first secret key x and the blinding vector a according to a first pre-established function. In this example, the first function is a function in which the first secret key x, known to the client 100, and the blinding vector a, not known to the client 100, are given as input values and the modified secret key a' (a'=x+a), obtained by adding the first secret key x and the blinding vector a, is given as an output value. Here, the client 100 and the server 200 share the first function.

In step S320, the server 200 generates an inquiry message MSG(a') including the modified secret key a' and transmits the generated inquiry message MSG(a') to the client 100.

In step S325, the client 100 having received the inquiry message extracts the modified secret key a' from the inquiry message MSG(a').

In step S330, the client 100 calculates the blinding vector a based on the modified secret key a' and the first secret key x according to a first inverse function corresponding to the first function. In the present example, the first inverse function is a subtraction function (i.e., a reduction function), in which the first secret key x and the modified secret key a' are given as input values, and the blinding vector a (a=a'−x), obtained by subtracting the first secret key x from the modified secret key a', is given as an output value.

In step S335, the client 100 authenticates the server based on the blinding vector a and determines a success or failure of the authentication.

For example, the client 100 may store a list of previously received blinding vectors in the first memory 110, and the client 100 may determine the authentication of the server 200 as a success when the blinding vector a received from the server 200 is included in the list.

Further, for example, the server 200 and the client 100 may share information on a blinding vector generation rule, and the client 100 may determine the authentication of the server 200 as a success when the blinding vector a received from the server 200 satisfies the blinding vector generation rule. For example, the blinding vector generation rule may include a condition that first and second bit values of the blinding vector should be identical to the last two bit values thereof.

Also, for example, the server 200 and the client 100 may share a security code table, and the client 100 may determine the authentication of the server 200 as a success when the blinding vector a received from the server 200 matches the security code table. For example, the security code table may include a first security code, which is configured by first to third bit values of the blinding vector, and a second security code, which corresponds to the first security code and is configured by the last three bit values of the blinding vector.

When the authentication of the server 200 fails, the client 100 does not perform the following step S340. When the authentication of the server 200 succeeds, the client 100 performs the following step S340.

The following steps S340, S345, S350, S355, S360, and S365 are substantially the same as steps S150, S155, S160, S165, S170, and S175 of the first exemplary embodiment, so a repetitive description thereof will be omitted here.

According to exemplary embodiments of the present invention, it is possible to perform authentication within an operation capability of an apparatus having limited resources. Further, exemplary embodiments of the present invention require relatively small storage quantity and transmission quantity, which enables its application to a lightweight apparatus. Also, the exemplary embodiments of present invention enable safe bidirectional authentication between a server and a client against a man-in-the-middle-attack known as the strongest attack in an authentication process. As a result, exemplary embodiments of the present invention can be safely applied to an apparatus having limited resources, such as a low priced RFID tag.

In the exemplary embodiments described above, the server may be a server device, such as a reader apparatus, and the client may be a client device, such as an RFID apparatus. However, it is to be understood that these are merely examples and that the present invention may be applied to any server and client.

Further, different terms used for convenience of understanding in the exemplary embodiments described above, including vector, matrix, and key, may be renamed the same term, i.e., value. Especially, it should be noted that the ordinal numbers, such as first and second, may be optionally appointed according to the sequence in which corresponding objects are mentioned.

It is also noted that exemplary embodiments of the present invention can be realized in hardware, software, or a combination of hardware and software. For example, regardless of possibility of the software being deleted or rerecorded, the software may be stored in a volatile or non-volatile storage unit such as an ROM, a memory such as a Random Access Memory (RAM), a memory chip, a unit or an integrated circuit, or an optically or magnetically recordable and machine (for example, computer)-readable storage medium such as a Compact Disc (CD), a Digital Video Disc (DVD), a magnetic disk or a magnetic tape. It can be seen that the memory which can be included in an imaging device is an example of a storage medium of a program including instructions for realizing the exemplary embodiments of the present invention or a storage medium which can be read by a machine suitable for storing the programs. Thus, exemplary embodiments of the present invention include a unit described in any claim, a program including a code for realizing the method, and a storage medium which can be read by a machine for storing a program.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An authentication method between a server and a client, the authentication method comprising:
   transmitting, to the client, an inquiry message including a first modified secret key generated based on a first secret key and a first blinding value;
   receiving, from the client, a response message including a response value generated based on the first blinding value, a second secret key, and an error value;
   calculating the error value from the response value; and
   determining whether authentication of the client has succeeded based on the error value,
   wherein the method further comprises:
   transmitting, to the client, a second modified secret key generated based on the first blinding value and a third secret key for authentication of the server.

2. The authentication method of claim 1, further comprising:
   receiving a blinding message including a second blinding value from the client,
   wherein the second modified secret key is generated based on the first blinding value, the third secret key, and the second blinding value.

3. The authentication method of claim 2, wherein the first secret key, the third secret key, the first blinding value, the second blinding value, and the error value are vectors, and the second secret key is a matrix.

4. A server for performing an authentication method between the server and a client, the server comprising:
   a memory for storing a first secret key and a first blinding value; and
   a controller for transmitting, to the client, an inquiry message including a first modified secret key generated based on the first secret key and the first blinding value, for receiving, from the client, a response message including a response value generated based on the first blinding value, a second secret key, and an error value, for calculating the error value from the response value, and for determining whether authentication of the client has succeeded based on the error value,
   wherein the controller is configured to:
   transmit, to the client, a second modified secret key generated based on the first blinding value and a third secret key for authentication of the server.

5. The server of claim 4, wherein the controller is configured to:
   receive a blinding message including a second blinding value from the client,
   wherein the second modified secret key is generated based on the first blinding value, the third secret key, and the second blinding value.

6. The server of claim 5, wherein the first secret key, the third secret key, the first blinding value, the second blinding value, and the error value are vectors, and the second secret key is a matrix.

7. The server of claim 4, wherein the first secret key, the second secret key, and the third secret key are shared between the client and the server.

8. An authentication method between a server and a client, the authentication method comprising:
   receiving, from the server, an inquiry message including a first modified secret key generated based on a first secret key and a first blinding value;

authenticating the server based on the first blinding value; and transmitting, to the server, a response message including a response value generated based on the first blinding value, a second secret key, and an error value.

9. The authentication method of claim 8, wherein the first secret key and the second secret key are shared between the client and the server.

10. The authentication method of claim 8, further comprising:
receiving, from the server, a second modified secret key generated based on the first blinding value and a third secret key for authentication of the server.

11. The authentication method of claim 10, wherein the authenticating of the server comprises:
generating a second modified secret key generated based on the first blinding value and a third secret key; and
comparing the generated second modified secret key with the received second modified secret key.

12. The authentication method of claim 10, further comprising transmitting a blinding message including a second blinding value to the server.

13. The authentication method of claim 12, wherein the first secret key, the third secret key, the first blinding value, the second blinding value, and the error value are vectors, and the second secret key is a matrix.

14. A non-transitory recording medium readable by a machine recording a program for executing an authentication method between a server and a client, the authentication method comprising:
receiving, from the server, an inquiry message including a first modified secret key generated based on a first secret key and a first blinding value;
authenticating the server based on the first blinding value; and
transmitting, to the server, a response message including a response value generated based on the first blinding value, a second secret key, and an error value.

15. A client for performing an authentication method between a server and the client, the client comprising:
a memory for storing a second secret key and an error value; and
a controller for receiving, from the server, an inquiry message including a first modified secret key generated based on a first secret key and a first blinding value, for authenticating the server based on the first blinding value, and for transmitting, to the server, a response message including a response value generated based on the first blinding value, the second secret key, and the error value.

16. The client of claim 15, wherein the first secret key and the second secret key are shared between the client and the server.

17. The client of claim 15, further comprising:
receiving, from the server, a second modified secret key generated based on the first blinding value and a third secret key for authentication of the server.

18. The client of claim 17, wherein the authenticating of the server comprises:
generating a second modified secret key generated based on the first blinding value and a third secret key; and
comparing the generated second modified secret key with the received second modified secret key.

19. The client of claim 17, further comprising transmitting a blinding message including a second blinding value to the server.

20. The client of claim 19, wherein the first secret key, the third secret key, the first blinding value, the second blinding value, and the error value are vectors, and the second secret key is a matrix.

* * * * *